(12) United States Patent
Brenner et al.

(10) Patent No.: US 9,514,635 B2
(45) Date of Patent: Dec. 6, 2016

(54) INTERFACE CIRCUIT FOR DISTRIBUTED FIRE ALARM IN LOOP CONFIGURATION

(71) Applicant: Thorn Security Limited, Sunbury-on-Thames, Middlesex (GB)

(72) Inventors: Andreas Brenner, Hohenkirchen (DE); Prasad Kulkarni, Winnersh (GB); Josef Baroch, Liberec (CZ); Vladimir Vetricek, Brno (CZ)

(73) Assignee: Thorn Security Limited, Sunbury-on-Thames, Middlesex (GB)

( * ) Notice: Subject to any disclaimer, the term of this patent is extended or adjusted under 35 U.S.C. 154(b) by 0 days.

(21) Appl. No.: 14/432,703

(22) PCT Filed: Oct. 8, 2013

(86) PCT No.: PCT/GB2013/052618
§ 371 (c)(1),
(2) Date: Mar. 31, 2015

(87) PCT Pub. No.: WO2014/057256
PCT Pub. Date: Apr. 17, 2014

(65) Prior Publication Data
US 2015/0279201 A1 Oct. 1, 2015

(30) Foreign Application Priority Data
Oct. 8, 2012 (GB) .................................... 1217970.1

(51) Int. Cl.
G08B 25/00 (2006.01)
G08B 29/18 (2006.01)
(Continued)

(52) U.S. Cl.
CPC ............. G08B 29/18 (2013.01); G08B 25/045 (2013.01); G08B 25/14 (2013.01); H04L 12/42 (2013.01)

(58) Field of Classification Search
CPC .......... G05B 9/03; G08B 25/00; G08B 25/04; G08B 25/14; G08B 25/045; G08B 29/02; G08B 29/18; H04L 12/42
(Continued)

(56) References Cited

U.S. PATENT DOCUMENTS 4,088,985 A * 5/1978 Saito .................... G08B 26/003
340/605
4,347,564 A * 8/1982 Sugano .................... G05B 9/03
700/3
(Continued)

FOREIGN PATENT DOCUMENTS

DE 10 2004 041 824 A1 3/2006
EP 1 811 782 A2 7/2007
(Continued)

OTHER PUBLICATIONS

International Search Report, from counterpart International Application No. PCT/GB2013/052618, filed on Oct. 8, 2013.
(Continued)

*Primary Examiner* — Hung T Nguyen
(74) *Attorney, Agent, or Firm* — HoustonHogle LLP

(57) ABSTRACT

An interface circuit of a sub-system of a distributed fire detection system having a plurality of sub-systems, wherein the plurality of sub-systems are in communication with each other in a loop configuration to allow data signals to be routed between said sub-systems. The interface circuit connects the internal components of a sub-system to the external bus line connecting all components via at least three input/output ports. It comprises hardware logic components, namely switches and switch controllers listening for incoming data and opening or closing said switches to cause disconnection and connection between said input/output ports accordingly, thereby allowing the routing of data signals to one or more of the other input/output ports. The simpler configurations replaces a routing processor.

14 Claims, 6 Drawing Sheets

(51) Int. Cl.
*G08B 25/04* (2006.01)
*H04L 12/42* (2006.01)
*G08B 25/14* (2006.01)

(58) Field of Classification Search
USPC 340/507, 508, 521, 534, 635, 657; 364/132, 364/187; 713/300, 324
See application file for complete search history.

(56) References Cited

U.S. PATENT DOCUMENTS 5,105,371 A * 4/1992 Shaw ................. G08B 17/10
340/511
2008/0024222 A1 * 1/2008 Moane ............... H03F 3/45475
330/258

FOREIGN PATENT DOCUMENTS

GB 2484288 * 11/2012 .......... G08B 25/045
WO 2010/030192 A1 3/2010

OTHER PUBLICATIONS

International Preliminary Report on Patentability, mailed on Apr. 16, 2015, from counterpart International Application No. PCT/GB2013/052618, filed on Oct. 8, 2013.

* cited by examiner

INTERFACE CIRCUIT FOR DISTRIBUTED FIRE ALARM IN LOOP CONFIGURATION

RELATED APPLICATIONS

This application is a §371 National Phase Application of International Application No. PCT/GB2013/052618, filed on Oct. 8, 2013, now International Publication No. WO 2014/057256 A1, published on Apr. 17, 2014, which International Application claims priority to British Application No. GB 1217970.1, filed on Oct. 8, 2012, both of which are incorporated herein by reference in their entirety.

FIELD OF THE INVENTION

The invention relates to an interface circuit and, in particular, to an interface circuit for a sub-system of a fire detection system. The invention also relates to a sub-system of a fire detection system.

BACKGROUND OF THE INVENTION

Modern detector systems, such as fire detection systems, intruder detection systems, and flood detection systems include a number of detectors which are connected to a common wired network together with a central control unit. For example, in a fire detection and alarm system, the central control unit, such as a fire alarm control panel (or commonly referred in the art as a Control and Indicating Equipment (CIE)), has a number of detectors connected to it in a loop. The detectors are located throughout a premise to detect changes associated with fire.

As illustrated in FIG. 1, a known fire detection system 10 has a CIE 12, a plurality of detectors, labelled $S_1$ to $S_n$, and control line 14 connecting, the CIE 12 to the detectors. The control line 14 forms a single loop, beginning and ending at the CIE 12. In this example, the system 10 has only one loop, but it will be appreciated that the system might have a plurality of loops, each loop connecting a plurality of detectors to the CIE 12.

As shown in FIG. 2 another known fire detection system 20 may have one or more CIEs 30, 40, 50 distributed in a monitored area. Referring to FIG. 2, each of the CIEs, for example CIE 30, in the system comprises at least two Input/Output (I/O) terminals 30a, 30b to allow the CIE 30 to be connected, by means of data buses 32, 36 to other CIEs 40, 50 to faint a CIE communication network, so that information from a CIE can be relayed to another CIE through the network. Similarly, each of the CIEs has a plurality of detectors connected to it in a single loop (or multiple loops) as described in the preceding paragraph.

A CIE of the fire detection system of FIGS. 1 and 2 will now be described with respect to FIG. 3.

FIG. 3 shows schematically the components of a CIE 12. In this simplified illustration, the CIE 12 includes a Main Central Processing Unit (MCPU) 60, a Loop Central Processing Unit (LCPU) 62, and a User Interface (UI) 64. For the sake of simplicity, only the MCPU 60, LCPC 62, and the UI 64 are illustrated in FIG. 3. However, it will be appreciated that the CIE 12 may comprise other components, such as memory, or data storage means. By means of an internal bus 66, the MCPU 60, LCPU 62, and the UI 64 are in communication with each other, and other CIEs in the network.

The primary function of the MCPU 60 is to control the overall operation of the CIE 12 including transmitting an alarm signal upon receiving a signal from the LCPU 62 indicating a fire. A plurality of detectors are connected to the LCPU 62 in a single loop so that in event of a fire, a detector can provide an alarm signal to the LCPU 62 which in turn provides a signal to the MCPU 60 so that a decision on what action to take can be made based on a predetermined sequence. Of course, multiple loops of detectors can be connected to the LCPU 62.

The CIE 12 also includes input/output terminals 68, 70 through which data signals can be transmitted to/received from another CIE.

In the prior art, a routing processor is required to route data (or information) between the internal data bus 66 and an external data bus (not shown) in order to transfer data from/to a component of a CIE to another CIE in the network. The routing processor may be incorporated into one of the components of the CIE (for example, the MCPU) to control routing of data between the internal data bus and the external data bus. However, in the event that the routing processor fails, it will not be possible to route the data between the internal bus and the external data bus—resulting in communication failure.

SUMMARY OF THE INVENTION

In a first aspect of the invention there is provided an interface circuit of a sub-system of a distributed fire detection system having a plurality of sub-systems, wherein the plurality of sub-systems are in communication with each other in a loop configuration to allow data signals to be routed between said sub-systems, the interface circuit comprising at least three input/output ports through which data signals can be received or transmitted, each of said ports being connectable to at least two of the other input/output ports to establish a connection therebetween, a plurality of switches, each switch arranged between a pair of the input/output ports to establish a connection, the switch having a closed position and an open position; and a plurality of sensors, each being coupled to a respective one of said input/output ports, and upon detection of said data signals the sensor is operable to generate a control signal to open or close at least one of said switches to cause disconnection and connection between said input/output ports, thereby allowing the data signals to be routed to one or more of the other input/output ports. This is advantageous in that the interface circuit allows routing of data between the sub-systems using hardware logic devices, without relying on a routing processor.

Preferably, said switches are connected together in a loop, thereby allowing data signals to pass from one input/output port to any other input/output port of the interface circuit.

The control signal is generated upon detection of a beginning of said data signals.

Each of said sensors may comprise a first terminal and a second terminal, the first terminal being connected to said respective input/output port and the second terminal being connected to at least two switches.

The interface circuit may be arranged between an internal data bus of said sub-system and at least two external data buses coupled with said sub-system, such that the interface circuit allows data communication between at least one component of said sub-system and another sub-system of said plurality of sub-systems.

The interface circuit may be incorporated into a complex programmable logic device.

In a second aspect of the invention there is provided a sub-system for a fire detection system, comprising an interface circuit according to the above aspect.

The sub-system may further comprise a main central processing unit, a loop central processing unit, a user interface unit, and an internal data bus through which said units are in communication with each other and the interface circuit.

The internal data bus may be in accordance with the RS 485 standard.

In a third aspect of the invention there is provided a fire detection system comprising a sub-system according to the second aspect, and at least one further said sub-system arranged to communicate with each other via said interface circuit of the first aspect.

BRIEF DESCRIPTION OF THE DRAWINGS

Embodiments of the invention will now be described with reference to the accompanying drawings, wherein.

DETAILED DESCRIPTION

Specific embodiments of the invention will be described in further detail in the following description with reference to the attached figures. It will be appreciated that the embodiments are described by way of example only, and should not be viewed as presenting any limitation on the scope of protection.

European standard, EN54, specifies requirements for all component parts of a fire alarm system. The EN54 standard also introduces a concept of distributed CIE (Control and Indicating Equipment). In simple terms, a distributed CIE allows components, such as the MCPU, LCPU, and UI that form a single CIE to be distributed in a number of independent "sub-CIEs" in the network, such that operation of the sub-CIEs in the network can be controlled by a single MCPU located in one of the sub-CIEs to allow a common global event or action in an event of a fire.

Figure 1:
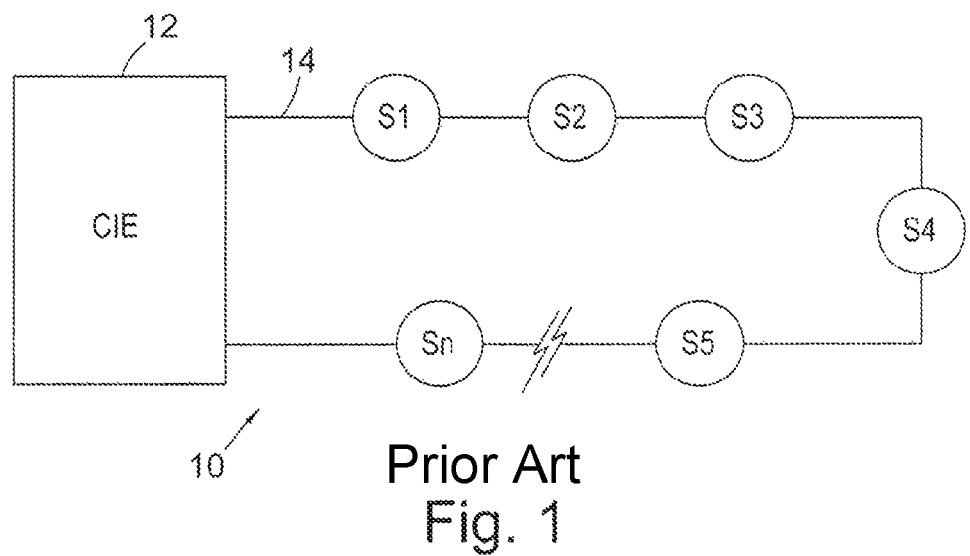
FIG. 1 illustrates an arrangement of a detection system according to the prior art.
Figure 2:
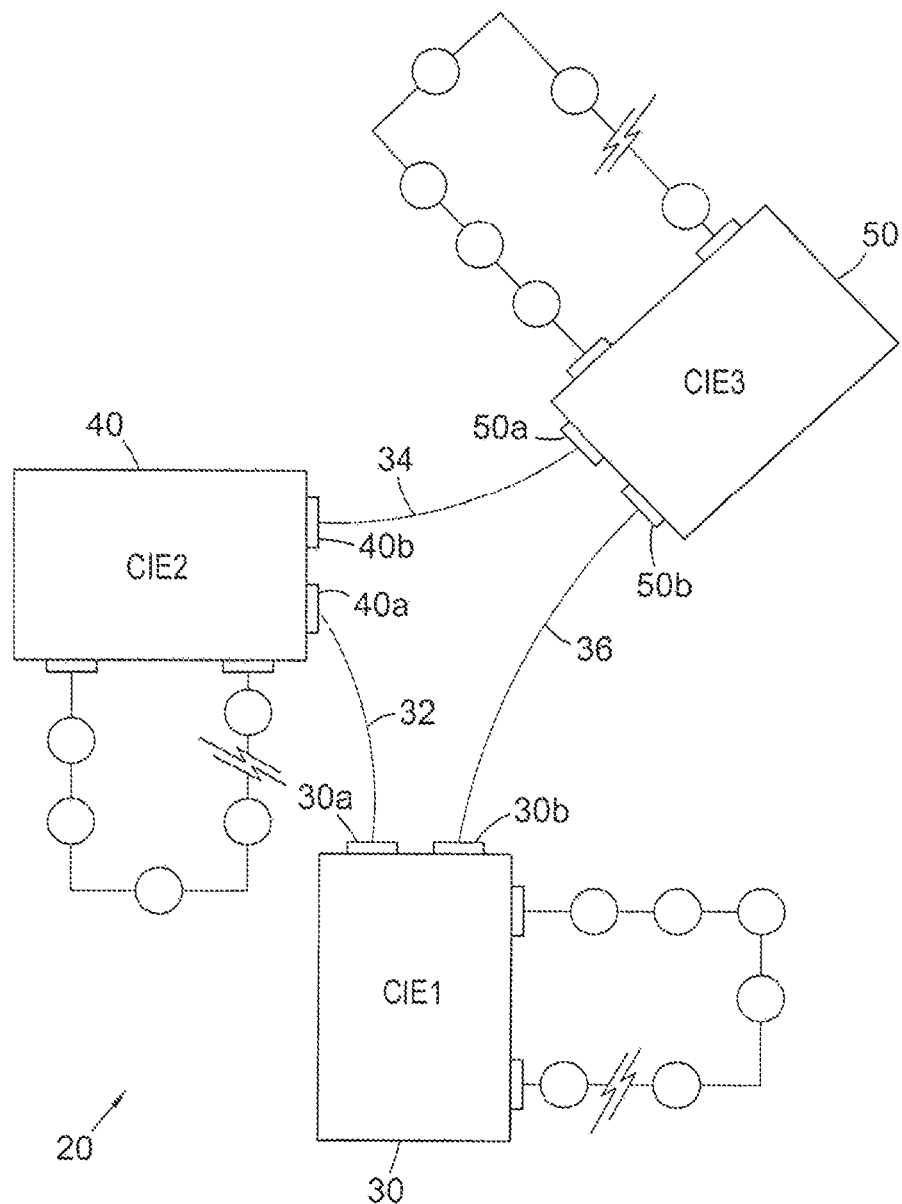
FIG. 2 illustrates an arrangement of a loop communication network according to the prior art.
Figure 3:
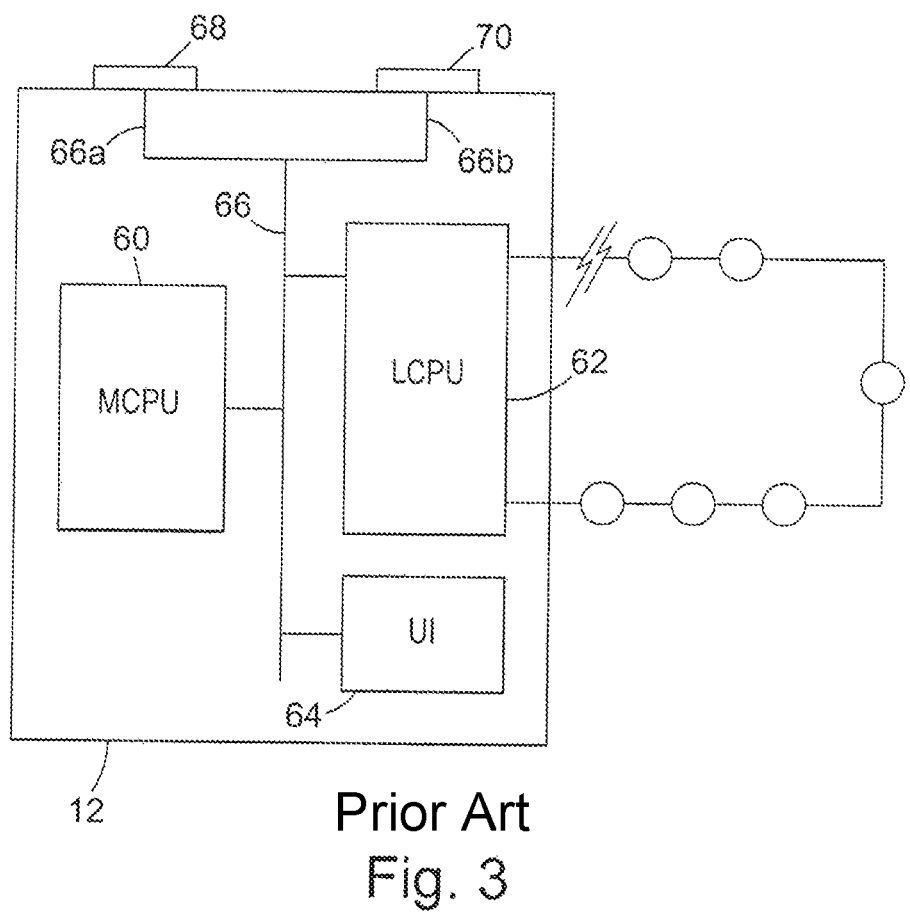
FIG. 3 illustrates a schematic representation of a prior art control panel.
Figure 4:
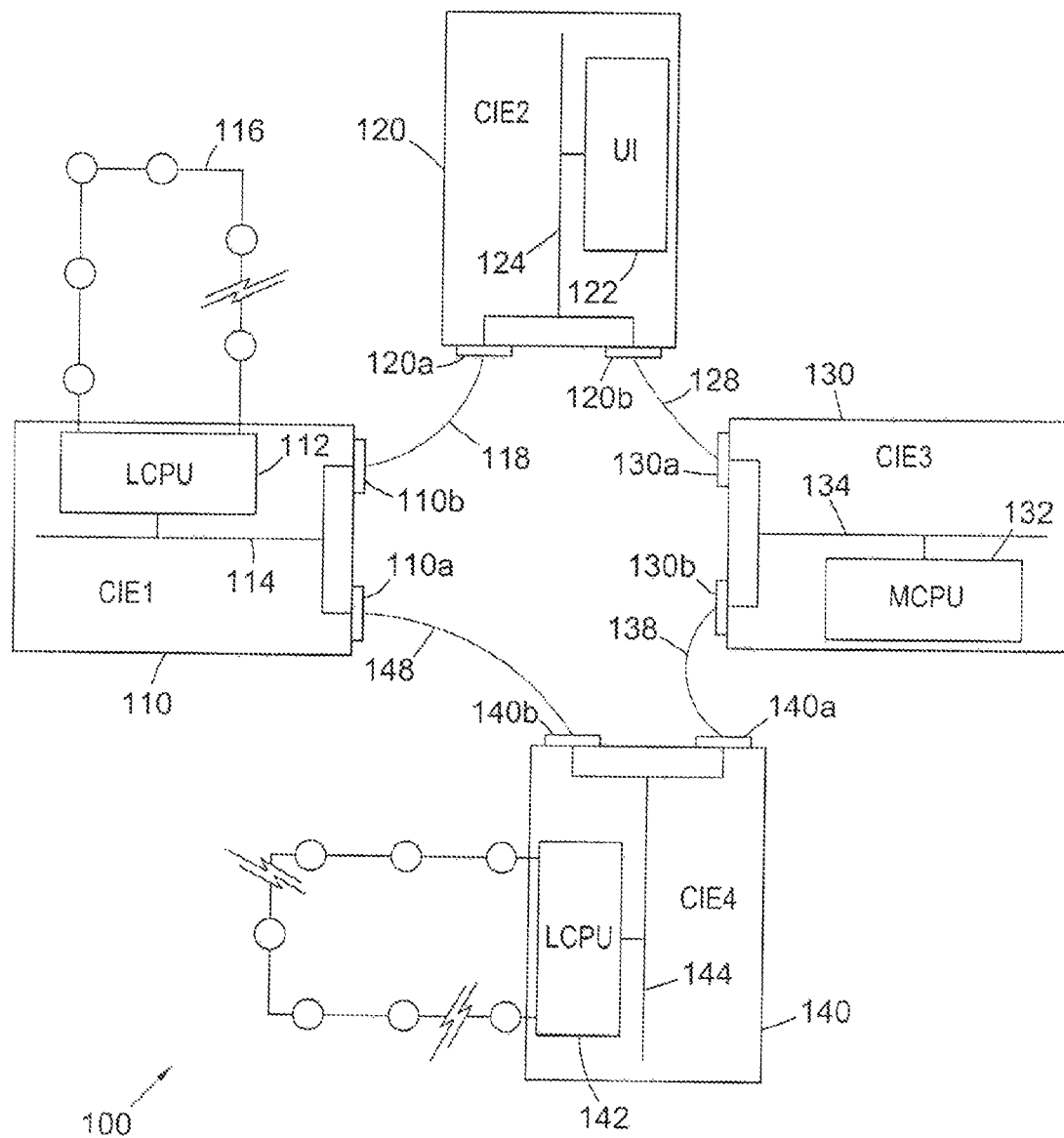
FIG. 4 illustrates an example of a distributed loop communication network according to an, embodiment of the invention.

An example of a distributed CIE system deployed in a monitored area is illustrated in FIG. 4. In this example, the distributed CIE network 100 is a collection of sub-CIEs 110, 120, 130, 140 having different components that together form the function of a CIE.

The distributed CIE system 100 in FIG. 4 includes four sub-CIEs 110, 120, 130, 140 in communication with each other in a single loop configuration. Each sub-CIE includes a first I/O terminal 110a, 120a, 130a, 140a, and a second I/O terminal 110b, 120b, 130b, 140b. As shown in FIG. 4, the second I/O terminal 110b of sub-CIE 110 is connected to the first I/O terminal 120a of sub-CIE 120 via a data bus 118. Similarly, the second I/O terminal 120b of sub-CIE 120 is connected to the first I/O terminal 130a of sub-CIE 130 via a data bus 128. The second I/O terminal 130b of sub-CIE 130 is connected to the first I/O terminal 140a of sub-CIE 140 via a data bus 138. Finally, the second I/O terminal 140b of sub-CIE 140 is connected to the first I/O terminal 110a of sub-CIE 110 via a data bus 148.

In this example, detectors are deployed in detector loops 116 by the sub-CIE 110 and the sub-CIE 140 by means of LCPU 112 and LCPU 142 respectively.

A MCPU 132 located in sub-CIE 130 controls the overall operation of the distributed CIE system 100. Sub-CIE 130 functions as a central monitoring and controlling unit that receives information from the LCPU 112 of sub-CIE 110 via data buses 118 and 128, or data buses 148 and 138, depending on the direction in which the data is routed. Sub-CIE 130 also receives information from the LCPU 142 of sub-CIE 140 via data bus 138, or data buses 148, 118 and 128.

The MCPU 132 makes a decision on what action to take based on the received information, such as providing for automatic control of equipment, and transmission of information necessary to prepare the monitored area for fire based on a predetermined sequence. For instance, if a fire is detected by one of the detectors connected to LCPU 112, a fire signal is reported from sub-CIE 110 through the distributed CIE network 100 to the MCPU 132 of sub-CIE 130. Upon receiving the fire signal, the MCPU 132 interprets the information and, if appropriate, provides an alarm signal to a user interface (UI) 122 in sub-CIE 120. As shown in FIG. 4, the UI 122 and MCPU 132 are in communication via the data bus 128.

The UI 122 includes user operable input devices such as a keyboard and a touchpad, but could include a mouse or other pointing device, a contact sensitive surface on a display unit of a computer terminal, or any other means by which a user input action can be interpreted and converted into data signals. The UI 122 allows the user to program the MCPU 132 by transmitting the converted data signals from the user's input to the MCPU 132. The UI also includes output device(s) capable of providing an output signal according to a signal sent from the MCPU 132. The output device may also include a display screen for presenting the user with a message describing the location of the alarm and the type of event (e.g. smoke, or heat). For example, when the UI 122 receives an alarm signal from the MCPU 132, the UI 122 switches on a siren or relays the alarm signal to the fire brigade.

It is noted that one of the requirements of a distributed CIE system is the ability to communicate between the distributed components of the CIE over more than one communication path. For example, if the data bus 118 is broken or disconnected, the MCPU 132 in sub-CIE 130 is still able to communicate with sub-CIE 110 via data buses 138 and 148.

The component(s) in a sub-CIE (e.g. 140) are connected to an internal bus 144 which is connected to the I/O terminals of the sub-CIE 140 to allow the components of the sub-CIE 140 to communicate with other sub-CIEs 110, 120, 130 in the network. As shown in FIG. 4, the internal bus 144 is split into two paths which are connected to I/O terminals 140a and 140b. It is noted that the I/O terminals 140a, 140b are bidirectional.

Figure 5:
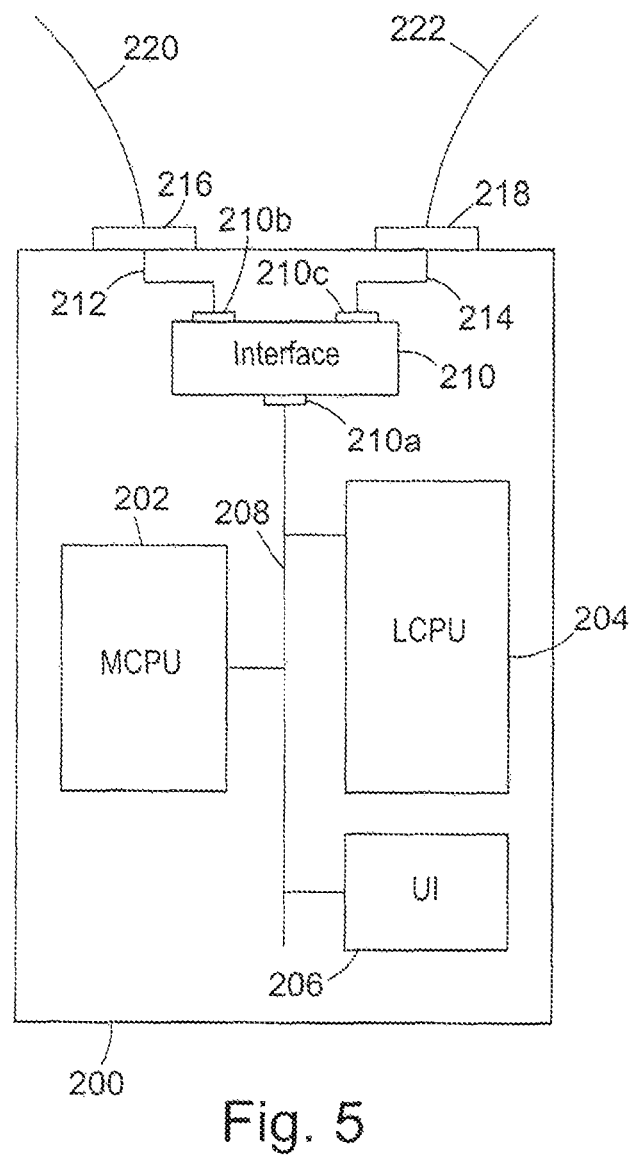
FIG. 5 illustrates a schematic representation of a sub-CIE according to an embodiment of the invention.

FIG. 5 illustrates a sub-CIE 200 of a distributed CIE system which is generally capable of establishing communication with one or more other sub-CIEs for data communication and, according to embodiments of the invention, of control routing of data between an internal bus 208 of the sub-CIE 200 and a pair of external buses 220, 222 connected to the sub-CIE 200.

The CIE 200 illustrated in FIG. 5 comprises a Main Central Processing Unit (MCPU) 202, a Loop Central Processing Unit (LCPU) 204, and a User Interface (UI) 206. In the present embodiment, the primary function of the MCPU 202 is to control the overall operation of the distributed CIE 200 including transmitting an alarm signal upon receiving a signal from a LCPU indicating tire. A plurality of detectors (not shown) is connected to the LCPU 204 in a single loop or in multiple loops so that in an event of a fire, a detector can provide an alarm signal to the LCPU 204 which in turn provides a signal to the MCPU 202 so that a decision on what actions to take can be made based on a predetermined sequence.

Although it is illustrated in this example that the components of the sub-CIE 200 includes a MCPU 202, a LCPU 204, and a UI 206, a skilled reader will appreciate that in a distributed CIE system network these components may be distributed in other locations (in other sub-CIEs) in the network.

The components (MCPU 202, LCPU 204, and UI 206) of the sub-CIE 200 are connected to an internal bus 208 which allows data to be routed between the components and other distributed sub-CIE in the network.

The sub-CIE 200 also includes a first I/O terminal 216, and second I/O terminal 218, both of which are bidirectional, and an interface circuit 210 operable to route data between the internal bus 208 and the external buses 220, 222 to enable communication of data between distributed sub-CIEs in the network. In this example, the internal data bus conforms to the RS 485 standard.

As shown in FIG. 5, the interface circuit 210 comprises three input/output (I/O) ports 210a, 210b, and 210c. I/O port 210a is connected to the internal bus 208, I/O port 210b is connected to I/O terminal 216 of the sub-CIE 200 via internal bus 212, and I/O port 210c is connected I/O terminal 218 of the sub-CIE 200 via to internal bus 214.

In this illustrated example, the interface circuit 210 comprises three I/O ports, but it will be appreciated that practical implementations may include more I/O ports depending on the application. An example of the interface unit is a programmable logic device, such as a Complex Programmable Logic Device (CPLD). Other suitable hardware devices also include an application specific device such as an ASIC or and FPGA, or other dedicated functional hardware means.

One of the advantages of the invention is that it allows routing of data between internal and external data buses using hardware logic devices, without relying on a routing processor.

An interface circuit for routing data between an internal bus of a sub-CIE and external data buses connected to the sub-CIE will now be described in more detail with respect to FIG. 6. The interface circuit implemented in a sub-CIE allows components of the sub-CIE and other sub-CIEs connected to it to communicate seamlessly with each other without the need for a routing processor to control communication between the internal and external data bus.

Figure 6:
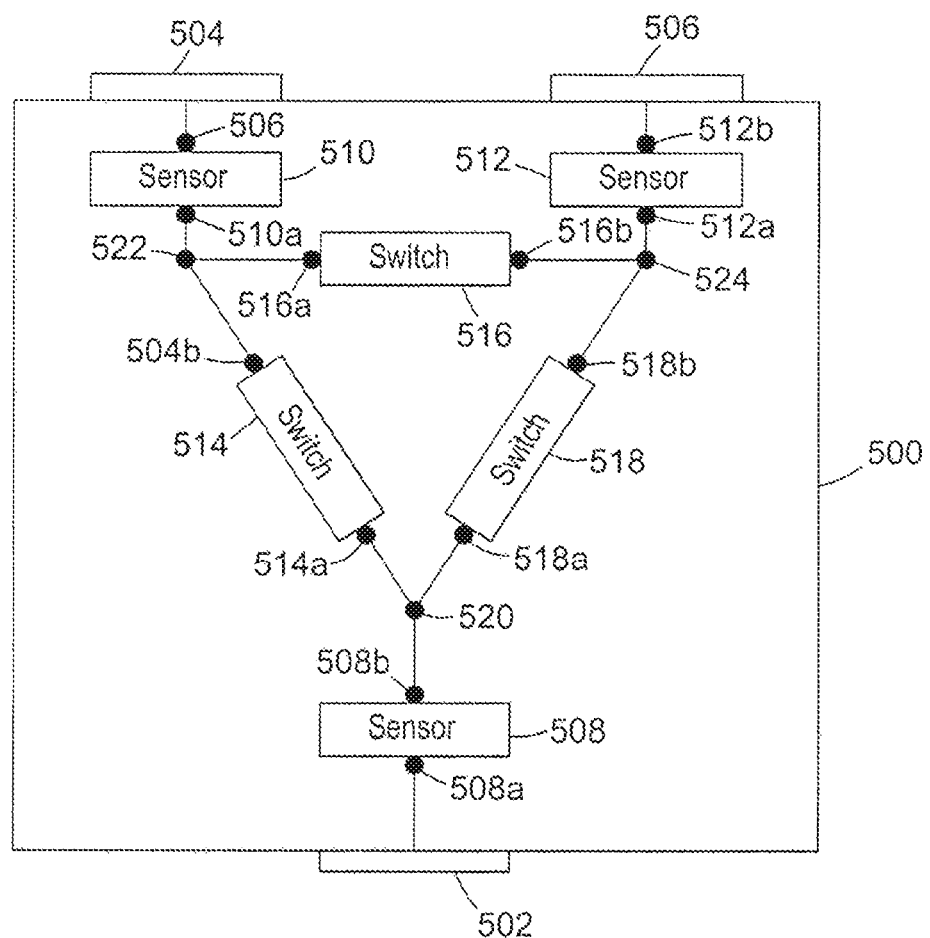
FIG. 6 illustrates a schematic representation of an interface circuit according to an embodiment of the invention.

FIG. 6 shows schematically components of an interface circuit 500. The interface device 500 comprises first, second, and third input/output (I/O) ports 502, 504, 506, first, second, and third sensors 508, 510, 512, and first, second, and third switches 514, 516, 518.

Each of the sensors 508, 510, 512, comprises two terminals, wherein one of the terminals is connected to an I/O port of the interface device 500 and the other terminal is connected to two switches. The switches 514, 516, 518 in the interface device 500 are connected together in a series loop. The switches 514, 516, 518 are controlled by control signals via control lines (not shown). Alternatively, the control signals are generated by the sensors 508, 510, 514.

In detail, the sensor 508 comprises a first terminal 508a and a second terminal 508b. The first terminal 508a is connected to the I/O port 502 through which communication can be established with an internal bus (not shown). The second terminal 508b is connected to a first terminal 514a of the switch 514 and a first terminal 518a of the switch 518. A second terminal 514b of the switch 514 and a second terminal 518b of the switch 518 are connected respectively to a first terminal 516a and a second terminal 516b of the switch 516, such that the switches 514, 516, 518 in the interface device 500 are connected together in a series loop. The second terminal 514b of switch 514 and the first terminal 516a of switch 516 are also connected to a first terminal 510a of the sensor 510, and a second terminal 510b of the sensor 510 is connected to the I/O port 504. Similarly, the second terminal 518b of terminal 518 and the second terminal 516b of switch 516 are connected to a first terminal 512a of the sensor 512, and a second terminal 512b is connected to the I/O port 506.

Each of the sensors 508, 510, 512 is configured to detect the start of a data signal transmitted from one sub-CIE to another sub-CIE, and to generate a control signal to control the operation of the switches that are connected to a common connection point. For example, a sensor can be configured to detect a start bit of a data stream (or a header of a data packet) received at a respective I/O port of the interface device. It is noted that any suitable method of detecting the start of data transmission may be employed. For this reason, details of the sensor will not be further described.

When sensor 508 detects a start bit of a data signal, it generates a control signal to close either switch 514 or switch 518, depending on the direction in which the data signal is to be routed in the distributed CIE system. For example, upon detection of a start bit of a data signal coming through the interface device 500 at port 502, the sensor 508 generates a control signal to close switch 514 such that the connection points 520 and 522 are connected to each other. Switches 516 and 518 remain open. In this configuration, data signals received from the internal components via I/O port 502 are directed to I/O port 504 and to an external data bus via sensor 508, switch 514 and sensor 510. In another example, the sensor 508 may generate a control signal to close switch 518 rather than switch 514, so that data signals received from the internal components via I/O port 502 are directed to I/O port 506 to an external data bus via sensor 508, switch 518 and sensor 512. In this example, switches 514 and 516 remain open.

However, when an external data signal is received via I/O port 504, the sensor 510 generates a control signal to close switches 514 and 516, and switch 518 remains open. In this configuration the data signal is directed to internal components of the sub-CIE through switch 514 via I/O port 502. The data signal is also directed through switch 516 to an external data bus connected to I/O port 506. This configuration may be appropriate, for example, in the sub-CIE 130 of FIG. 4. Referring to FIGS. 4 and 6, when a fire signal detected by a detector of the LCPU 142 of sub-CIE 140 is sent to sub-CIE 130 via external data bus 138, the lire signal is directed to the MCPU 132 of sub-CIE 130 to inform the MCPU 132 that a fire has been detected. The fire signal is directed to the MCPU via I/O port 504, switch 514, and I/O port 502 of the interface circuit 500. As the switch 516 of the interface circuit 500 is also closed, the fire signal can be relayed to another sub-CIE (in this example, sub-CIE 120), via I/O port 504, switch 516, and I/O port 506 of the interface circuit 500. The fire signal that is relayed to sub-CIE 120 can be used to display a warning message via the UI 122 of sub-CIE 120.

In yet another example, the sensor 510, upon detection of a data signal coming through the interface circuit 500 at port 504, generates a control signal to close switch 516 such that the connection points 522 and 524 are connected to each other. Switches 514 and 518 remain open. In this configuration, data signals received via. I/O port 504 are directed to I/O port 506 and to an external data bus via sensor 510, switch 516 and sensor 512. This configuration can be implemented, for example, in the sub-CIE 120 of FIG. 4, so that the sub-CIE 120 simply acts as a relay to relay a fire detected signal from the LCPU 112 of sub-CIE 110 to the MCPU 132 of sub-CIE 130. Referring to the set up in FIG. 4, when a fire signal is detected by the LCPU 112 of sub-CIE 110, the fire signal is sent from the LCPU 112 of sub-CIE 110 to sub-CIE 120 via I/O port 110*b* and data bus 118. Upon receiving the fire signal at I/O port 120*a*, the fire signal is immediately directed to I/O port 120*b*, and subsequently to the MCPU 132 of sub-CIE 130 via data, bus 128 and I/O port 130*a*.

In yet another example, when an external data signal is received via I/O port 506, the sensor 512 detects a start bit of a data signal and generates a control signal to close switches 516 and 518, and to set switch 514 in an open configuration. In such a configuration, the data signal entering the I/O port 506 is directed to internal components of the unit through switch 518 via I/O port 502. The data signal is also directed through switch 516 to an external data bus connected to I/O port 504.

It will be appreciated by the person skilled in the art that although examples provided herein are directed to fire detection systems, the devices or circuits described can also be applied to any environmental detection system. For example, the described method can be applied to a flood detection system in a monitored area.

While certain embodiments have been described, these embodiments have been presented by way of example only, and are not intended to limit the scope of the inventions. Indeed, the novel circuits, devices and systems described herein may be embodied in a variety of other forms; furthermore, various omissions, substitutions and changes in the form of the circuits, devices and systems described herein may be made without departing from the spirit of the inventions. The accompanying claims and their equivalents are intended to cover such forms or modifications as would fall within the scope and spirit of the inventions.

The invention claimed is:

1. An interface circuit of a sub-system of a distributed fire detection system having a plurality of sub-systems, wherein the plurality of sub-systems are in communication with each other in a loop configuration to allow data signals to be routed between said sub-systems, the interface circuit comprising:
at least three input/output ports through which data signals can be received or transmitted, each of said ports being connectable to at least two of the other input/output ports to establish a connection therebetween;
a plurality of switches, each switch arranged between a pair of the input/output ports to establish a connection, the switch having a closed position and an open position; and
a plurality of sensors, each being coupled to a respective one of said input/output ports, and upon detection of said data signals the sensor is operable to generate a control signal to open or close at least one of said switches to cause disconnection and connection between said input/output ports, thereby allowing the data signals to be routed to one or more of the other input/output ports.

2. An interface circuit according to claim 1, wherein said switches are connected together in a loop, thereby allowing data signals to pass from one input/output port to any other input/output port of the interface circuit.

3. An interface circuit according to claim 1, wherein the control signal is generated upon detection of a beginning of said data signals.

4. An interface circuit according to claim 1, wherein each of said sensors comprises a first terminal and a second terminal, the first terminal being connected to said respective input/output port and the second terminal being connected to at least two switches.

5. An interface circuit according to claim 4, wherein the interface circuit is arranged between an internal data bus of said sub-system and at least two external data buses coupled with said sub-system, such that the interface circuit allows data communication between at least one component of said sub-system and another sub-system of said plurality of sub-systems.

6. An interface circuit according to claim 1, wherein the interface circuit is incorporated into a complex programmable logic device.

7. An interface circuit according to claim 1, wherein:
a first switch of the switches is arranged to establish a connection between a first port of the input/output ports and a second port of the input/output ports;
a second switch of the switches is arranged to establish a connection between the second port and a third port of the input/output ports; and
a third switch of the switches is arranged to establish a connection between the first port and the third port.

8. An interface circuit according to claim 7, wherein:
a first sensor of the sensors being connected between the first switch and the third switch on one side and the first port on the other side;
a second sensor of the sensors being connected between the first switch and the second switch on one side and the second port on the other side; and
a third sensor of the sensors being connected between the second switch and the third switch on one side and the third port on the other side.

9. A sub-system for a distributed fire detection system, comprising an interface circuit, the subsystem being in communication with other sub-systems using a loop configuration to allow data signals to be routed between said sub-systems, the interface circuit comprising:
at least three input/output ports through which data signals can be received or transmitted, each of said ports being connectable to at least two of the other input/output ports to establish a connection therebetween;
a plurality of switches, each switch arranged between a pair of the input/output ports to establish a connection, the switch having a closed position and an open position; and
a plurality of sensors, each being coupled to a respective one of said input/output ports, and upon detection of said data signals the sensor is operable to generate a control signal to open or close at least one of said switches to cause disconnection and connection between said input/output ports, thereby allowing the data signals to be routed to one or more of the other input/output ports.

10. A sub-system according to claim 9, further comprising a main central processing unit, a loop central processing unit, a user interface unit, and an internal data bus through which said units are in communication with each other and the interface circuit.

11. A sub-system according to claim 10, wherein said internal data bus is in accordance with the RS 485 standard.

12. A fire detector system comprising sub-system according to claim 9, and at least one further said sub-systems arranged to communicate with each other via said interface circuit.

13. A subsystem according to claim 9, wherein:
a first switch of the switches is arranged to establish a connection between a first port of the input/output ports and a second port of the input/output ports;
a second switch of the switches is arranged to establish a connection between the second port and a third port of the input/output ports; and
a third switch of the switches is arranged to establish a connection between the first port and the third port.

14. A subsystem according to claim 13, wherein:
a first sensor of the sensors being connected between the first switch and the third switch on one side and the first port on the other side;
a second sensor of the sensors being connected between the first switch and the second switch on one side and the second port on the other side; and
a third sensor of the sensors being connected between the second switch and the third switch on one side and the third port on the other side.

* * * * *